(12) United States Patent
Mizrachi

(10) Patent No.: US 7,881,491 B2
(45) Date of Patent: Feb. 1, 2011

(54) METHOD, SYSTEM AND APPARATUS FOR OPERATING A DEVICE USING CONTEXTUAL SCRIPTING

(75) Inventor: Yoram Mizrachi, Herzelia (IL)

(73) Assignee: Perfecto Mobile Ltd., Petach-Tikva (IL)

( * ) Notice: Subject to any disclaimer, the term of this patent is extended or adjusted under 35 U.S.C. 154(b) by 925 days.

(21) Appl. No.: 11/802,261

(22) Filed: May 21, 2007

(65) Prior Publication Data

US 2008/0004828 A1    Jan. 3, 2008

Related U.S. Application Data

(60) Provisional application No. 60/803,152, filed on May 25, 2006, provisional application No. 60/803,157, filed on May 25, 2006.

(51) Int. Cl.
*G06K 9/00* (2006.01)

(52) U.S. Cl. ................. 382/100; 348/E17.005

(58) Field of Classification Search ......... 382/100, 382/152; 348/189, E17.005; 345/904; 702/57; 715/762, 864, 866
See application file for complete search history.

(56) References Cited

U.S. PATENT DOCUMENTS

| | | | |
|---|---|---|---|
| 5,602,932 A * | 2/1997 | Macdonald et al. | 382/100 |
| 2003/0095188 A1* | 5/2003 | Tsai et al. | 348/207.1 |
| 2003/0208712 A1* | 11/2003 | Louden et al. | 714/742 |
| 2005/0222690 A1* | 10/2005 | Wang et al. | 700/17 |
| 2005/0231595 A1* | 10/2005 | Wang et al. | 348/187 |

* cited by examiner

*Primary Examiner*—Andrew W Johns
(74) *Attorney, Agent, or Firm*—Pearl Cohen Zedek Latzer, LLP

(57) ABSTRACT

A system and method for interacting with a digital device by acquiring an image of a display of the device, deriving the functional state and context of the device by analyzing the acquired image and commanding the device to perform an action. the procedure described above may be repeated by a script or test procedure.

21 Claims, 6 Drawing Sheets

| CONTEXTUAL COMMAND | TRIVIAL IMPLEMENTATION |
|---|---|
| SEND SMS (MESSAGE, NUMBER) | PRESS KEY, ("<MENU>"), PRESS KEY ("<RIGHT ARROW>"), PRESS KEY, ("<RIGHT ARROW>"), PRESS KEY ("<RIGHT BUTTON>") ENTER STRING (NUMBER), PRESS KEY ("<RIGHT BUTTON>"), ENTER STRING (MESSAGE), ...... |
| ADD CONTACT (CONTACT) | PRESS KEY ("<MENU>"), PRESS KEY ("<RIGHT BUTTON>") PRESS KEY ("<DOWN ARROW>"), ENTER STRING (CONTACT, NAME) PRESS KEY ("<DOWN ARROW>"), ENTER STRING (CONTACT, NUMBER), ...... |

MOTOROLA C650

FIG.3A

| CONTEXTUAL COMMAND | TRIVIAL IMPLEMENTATION |
|---|---|
| SEND SMS (MESSAGE, NUMBER) | PRESS KEY, ("<MENU>"), PRESS KEY ("<RIGHT ARROW>"), PRESS KEY, ("<RIGHT ARROW>"), PRESS KEY ("<RIGHT BUTTON>") ENTER STRING (MESSAGE), PRESS KEY ("<RIGHT BUTTON>"), ENTER STRING (NUMBER), ...... |
| ADD CONTACT (CONTACT) | PRESS KEY ("<MENU>"), PRESS KEY ("<DOWN ARROW>"), PRESS KEY, ("<RIGHT BUTTON>"), ENTER STRING(CONTACT NAME), PRESS KEY ("<DOWN ARROW>"), ENTER STRING (CONTACT, NUMBER), ...... |

FIG.3B

METHOD, SYSTEM AND APPARATUS FOR OPERATING A DEVICE USING CONTEXTUAL SCRIPTING

CROSS-REFERENCE TO RELATED APPLICATIONS

This application claims benefit of U.S. Provisional Patent Applications Ser. No. 60/803,152 entitled "A method for systematic classification of mobile phone screen graphics into multi-layer well-defined objects" and Ser. No. 60/803,157, entitled "Method for abstracting mobile phone operations and display content into a logical, platform free representation" both filed May 25, 2006, the entire contents of which are incorporated herein by reference.

FIELD OF THE INVENTION

The present invention relates to method, system and apparatus for testing handsets and handset operating systems, and in particular for method, system and apparatus for automatedly carrying out instructions and/or commands on a handset for testing purposes.

BACKGROUND OF THE INVENTION

Testing methods often evolve as the equipment being tested evolves. Manual testing of electronic devices may become inadequate as electronic devices evolve in terms of complexity and diversity. Automation may enable a test procedure to have certain benefits, for example, to cover aspects of a tested device with coverage, accuracy and speed exceeding the limitation of a human tester.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 3 shows exemplary commands according to some embodiments of the invention;

Figure 1:
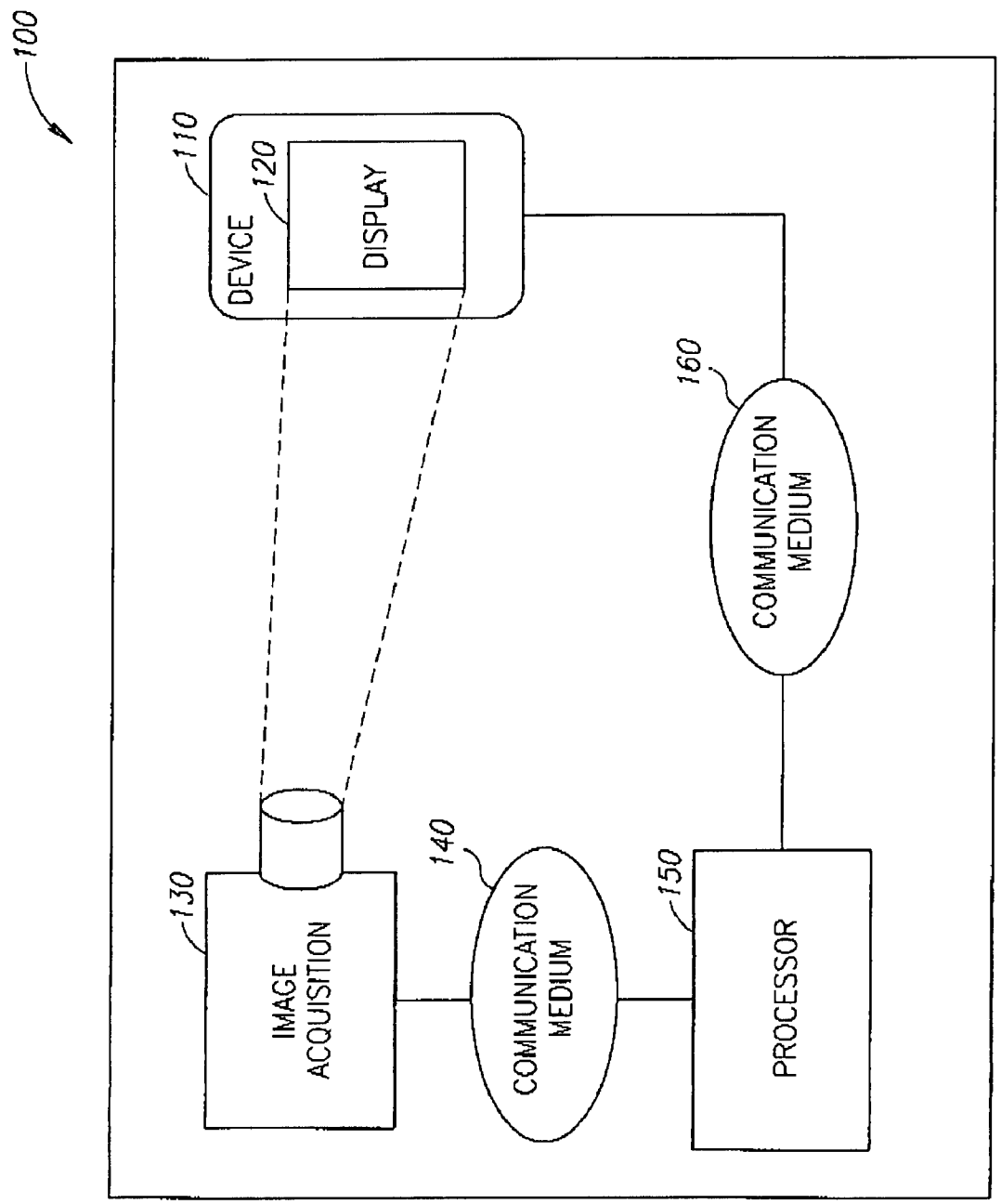
FIG. 1 shows a block diagram according to some embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Unless explicitly stated, the method embodiments described herein are not constrained to a particular order or sequence. Additionally, some of the described method embodiments or elements thereof can occur or be performed at the same point in time.

Testing of electronic equipment, such as for example, cellular phones, personal digital assistants (PDA), palmtop computers, music players or message receivers may involve inputting commands to a device and comparing the resulting behavior of the device with an expected behavior. A human tester may be employed to manually execute test procedures; however, as the complexity of devices increases, so does the complexity of the required test procedures. Furthermore, different devices, or models of such devices, may require different procedures in order to execute a given test. Automation of test procedures may improve the quality of the testing process, as well as shorten testing cycle time. Automation of testing may be implemented by executing test scripts or test procedures that may contain a sequence, or flow, of commands to be executed by the device under test. Devices may differ in the way functionalities are executed, as well as the way by which they are interfaced. Typically, a test script may need to be compiled for each device or device model being tested. Some embodiments of the present invention may exhibit ways by which the same test script may be used for testing multiple device types and/or models. The ability to test multiple types of devices, as well as multiple models with the same test script, may increase testing efficiency and quality as well as shorten time-to-market of products.

Reference is now made to FIG. 1 showing an exemplary system 100 according to some embodiments of the invention used to operate and/or test a device 110 having display 120. System 100 may comprise an image acquisition module 130 and processor 150, wherein image acquisition module 130 and processor 150 may be in communication via communication medium 140, and wherein device 110 and processor 150 may be in communication via communication medium 160.

Device 110 may be an electronic device such as, but not limited to, a cellular phone, a personal digital assistant (PDA), an electronic message receiver, or an electronic music player or any suitable device having a display. Image acquisition module 130 may be any suitable device, or software module, capable of acquiring an image of display 120. For example, image acquisition module 130 may be a camera, e.g., CCD, CMOS, etc., suitably equipped and suitably positioned to capture an image of display 120. Image acquisition module 130 may be connected to processor 150 by communication medium 140. Communication medium 140 may be, for example, a wire, a wireless link, a wired network, a wireless network, a serial connection, a USB connection, a Bluetooth connection, etc. Processor 150 may be a general-purpose computer, dedicated hardware, or a mixture of dedicated hardware and dedicated software, or any other suitable combination. Processor 150 may be connected to device 110 by communication medium 160. Communication medium 160 may be, for example, a wire, a wireless link, a wired network, a wireless network, a serial connection, a USB connection, a Bluetooth connection, etc.

Figure 2:
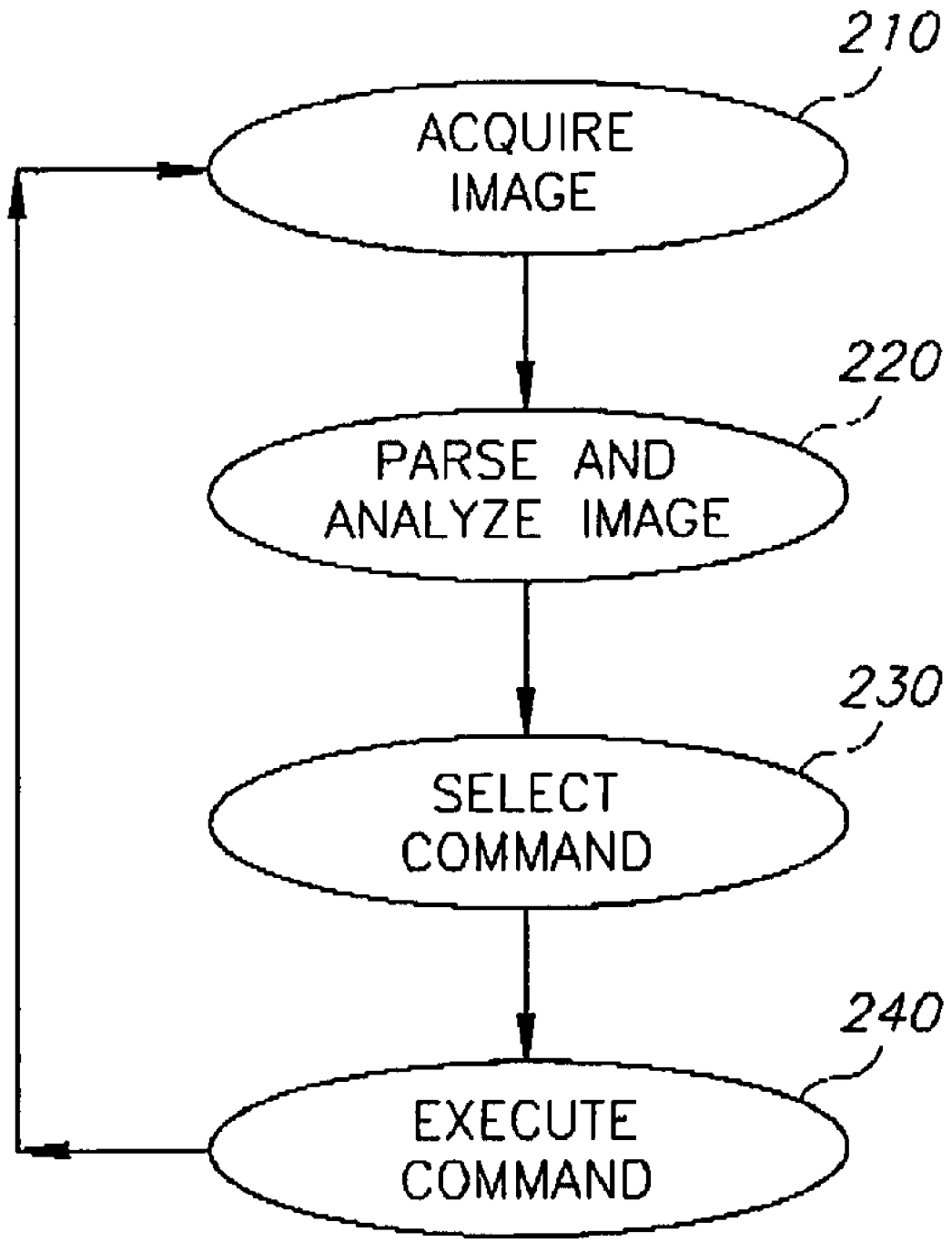
FIG. 2 shows an exemplary flowchart according to some embodiments of the invention.

Reference is now made to FIG. 2 showing an exemplary flow according to some embodiments of the invention. At block 210, an image may be acquired, for example, using an image acquisition module. The image may be communicated to a processor. At block 220, the image may be parsed and analyzed, for example, using a processor. At block 230, information gathered and/or deduced from the received image may be used to select a command to be executed on or by the device being tested. Additional information and/or parameters may be used for selecting a command, such as, for example, a predetermined test procedure, or a document associated with a device under test. An instruction communicated to the device under test may instruct the device to execute a selected command. At block 240, the command may be executed. The display of the device under test may reflect the results or execution of the command, and the flow may loop back to block 210, for example, until a desired result is reached, or until a last command is executed. For example, a processor may execute a test procedure and may terminate the flow when the test procedure ends. Another example of flow termination may be the termination of the flow when a processor determines that the device under test failed to execute a command. The processor may analyze the display image following an execution of a command and may determine, based on the image, and possibly other information, that the command succeeded or failed to execute.

According to some embodiments of the invention, image acquisition 130 may encode the image acquired according to a predefined format, the format of the image communicated to processor 150 may be a any suitable image format, for example, Joint Photographic Experts Group (.jpg), tagged image file format (.tiff), portable network graphics (.png), graphics interchange format (.gif), portable document format (.pdf), etc. Image acquisition 130 may further select the sample rate of the image communicated to processor 150. Image acquisition 130 may downsample or upsample the acquired image according to considerations such as but not limited to, memory constraints, display 120 objects size, or clarity of the image, network bandwidth, or other considerations.

According to some embodiments of the invention, image acquisition may be initiated by processor 150. For example, processor 150 may use communication medium 140 in order to instruct image acquisition 130 to acquire an image of display 120. In some embodiments of the invention, following issuance of an instruction to device 110, processor 150 may allow a period of time to elapse, possibly allowing device 110 to complete execution of a command, before instructing image acquisition 130 to acquire another image of display 120. Processor 150 may select a wait time before next image acquisition according to the complexity of the command being executed by device 110. According to some embodiments of the invention, after issuing a command to device 110, processor 150 may instruct image acquisition 130 to continue acquiring images of display 120. Processor 150 may analyze the acquired images, possibly tracking the progress of a command being executed by device 110. Possibly based on acquired images, processor 150 may determine a command execution has finished before issuing a new command to device 110. According to some embodiments of the invention, a command may instruct device 110 to execute a multimedia application. Multimedia application typically manipulate multimedia content such as audio, images and/or video, for example, playback of audio or video, copy and/or display images and the like. According to some embodiments of the invention, a command may instruct device 110 to execute network related applications. Network related applications may be applications that communicate over a network as part of their execution, for example downloading and playing of music. Applications such as Multimedia applications and network related applications may require substantial time to complete, processor 150 may track the progress of such applications execution by acquiring a series of images. In other embodiments of the invention, image acquisition 130 may acquire an image of display 120 periodically. For example, image acquisition 130 may acquire an image of display 120 every predefined number of seconds.

According to some embodiments of the invention, processor 150 may be provided with one ore more template documents. A device under test may be associated with one or more template documents. For example, device 110 may be one of a variety of cellular phones manufactured by a variety of manufacturers. It will be recognized that each manufacturer may manufacture different models, each with its own characteristics. Such characteristics may be, for example, font attributes such as size, color etc. Other device characteristics may be location of items on display 120, attributes of items, as well as meaning and context associated with various items on display 120. A specific template document may contain information pertaining to such characteristics of a specific device.

According to some embodiments of the invention, a template document may further contain a mapping of contextual commands to instructions. A contextual command may be a command that may be executed in relation to the functional context and/or state of device 110. For example, device 110 may be a mobile phone, in which case, a contextual command may be "Send SMS" or "Add Contact". Contextual commands may be generic commands that may be performed by a variety of devices, for example, "Send SMS" may be a contextual command that most mobile phones are capable of executing. Contextual commands may be transformed, using a template document, to a set of instructions that may be specific to a specific device. For example, if device 110 is a mobile phone, the contextual command "Send SMS" may be transformed, using a template document, to a sequence of key stroke instructions, which may cause device 110 to execute the "Send SMS" command. The sequence of key strokes into which a contextual command may be transformed may depend on the template document in use by processor 150. According to some embodiments of the invention, the transformation of a contextual command into a sequence of key strokes may dynamic. For example, transformation of a contextual command into a sequence of key strokes may depend on the functional context and/or state of device 110.

Reference is now made to FIGS. 3A and 3B, showing exemplary mapping in a template document. FIG. 3A shows a possible mapping of contextual commands "Send SMS' and "Add Contact" to instructions that may be suitable for a Motorola C650 cellular phone. FIG. 3B shows a possible mapping of contextual commands "Send SMS" and "Add Contact" to instructions that may be suitable for a Nokia A840 cellular phone. According to embodiments of the invention, processor 150 may further be equipped with contextual functions. Contextual functions may be functions that may be used by processor 150 in order to determine the functional state and/or contest of device 110. A contextual function may analyze an image of display 120 and determine, for example, using information in a template document, the functional state and/or context of device 110. Contextual functions may also be used to verify that device 110 successfully executed a command, e.g. a contextual function may be used to verify that display 120 presents the correct, and/or expected information following execution of a command, for example, that the correct color and/or items are displayed, or that no spelling mistakes exist in strings displayed by display 120.

According to some embodiments of the invention, parsing and/or analyzing of an image by processor 150 may comprise multiple passes. A first pass may locate and identify structured objects. Structured objects may represent the basic meaningful graphical objects on display 120. Examples of structured objects may be a character, an icon or a bitmap. Structured objects may have attributes associated with them, such attributes may be, for example, color, location on display 120, size, background, width, height, and possibly a value or a state contained or expressed in the structured object.

Figure 4:
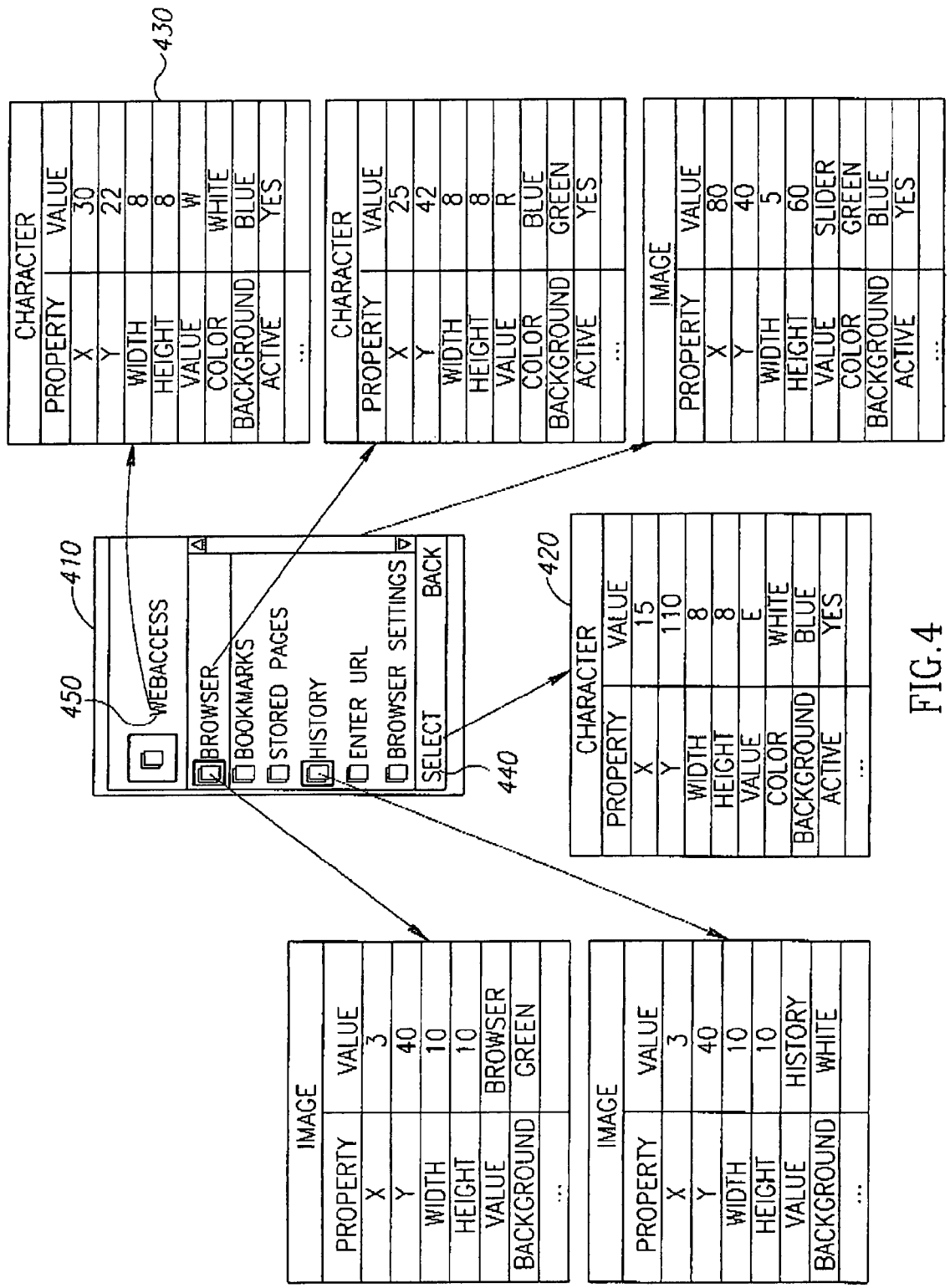
FIG. 4 shows exemplary screen objects according to some embodiments of the invention.

Reference is now made to FIG. 4 showing an exemplary display image and how structured objects therein may be identified by processor 150. Display image 410 may be an image of a cellular phone acquired by image acquisition 130. List 420 may list attributes of the character E in title 440. List 430 may list some of the attributes of the character W in title 450.

Figure 5:
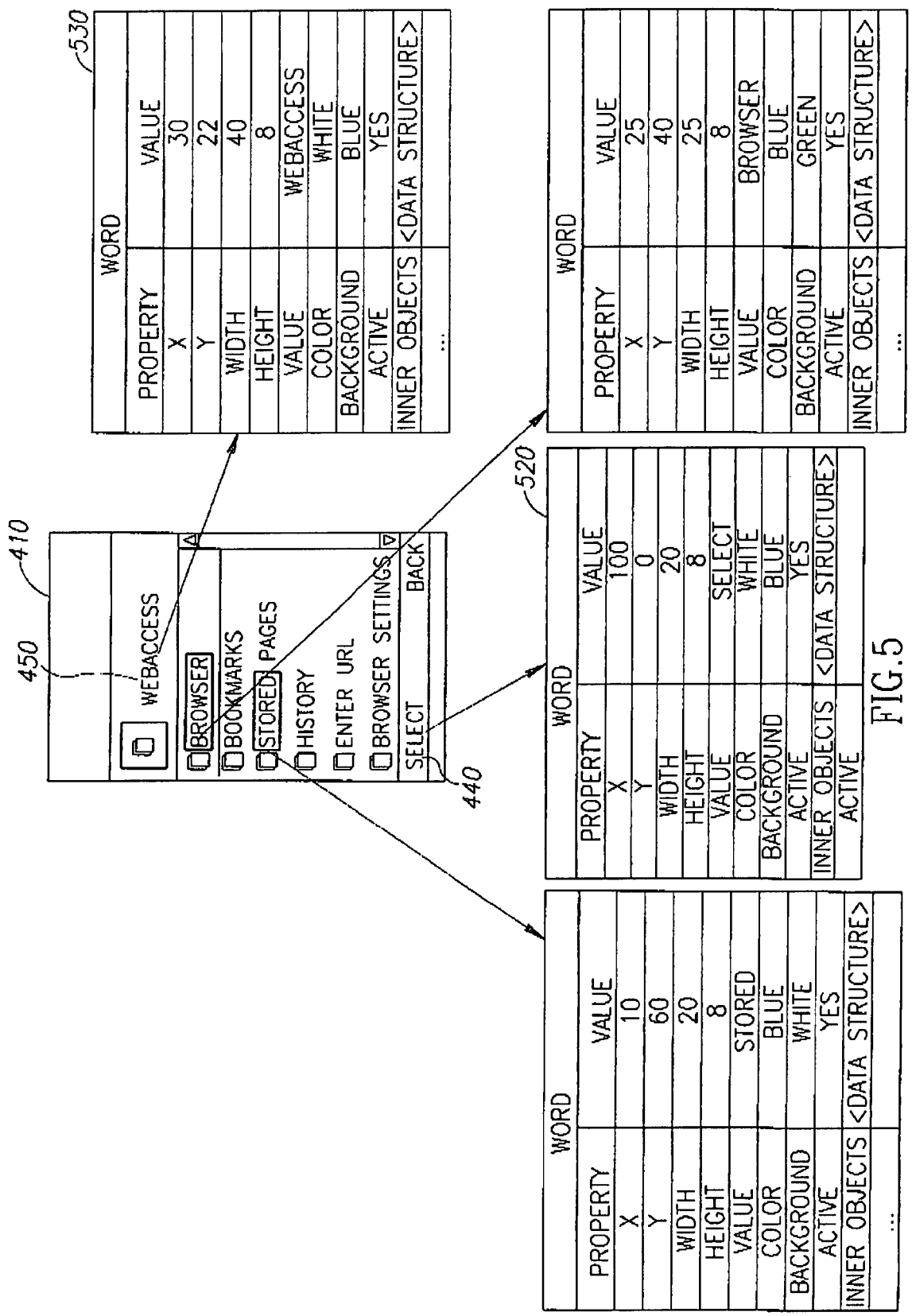
FIG. 5 shows exemplary screen objects according to some embodiments of the invention.

A second pass may group structured objects into contextual objects. Contextual objects may be, for example, words, lists, soft-buttons, menus, and images. Contextual objects may comprise structured objects and/or contextual objects. For example, a contextual object such as a word may be comprised of characters that may be structured objects. Structured objects and/or contextual objects may be grouped together to form contextual objects according to rules. A grouping rule may comprise information that may define which structured objects and/or contextual objects may be grouped into a contextual object. This information may be, for example, a list of objects allowed to be grouped into a given contextual object, or properties, such as color of words, or space between words, may be used in order to determine how to identify objects that may be grouped together into a contextual object. Another example of information that may be contained in a grouping rule may be indicators types. For example, a slider may be an indicator that the contextual object is a list. A slider may further indicate the location of items within a list. Grouping rules may be contained in a template document and may be specific to a device type or device model. Contextual objects may have attributes associated with them, such attributes may be, for example, color, location on display 120, size, background, width, or height. Other attributes which may be associated with contextual objects may be a value as well as type, for example, a contextual object may have the type of list, title or button. Contextual objects may provide an abstraction of display 120 objects. For example, a script referring to contextual objects may need not be aware of the way contextual objects are displayed by a certain device being used as device 110. For example, a test script may refer to a list being displayed on display 120 without caring about the specifics of the-displayed list, such as its color or size. Contextual objects may refer to logical objects, not necessarily objects that are displayed on display 120. For example, a list may be a contextual object, the list may contain six entries, out of which, possibly due to display 120 size, only four entries may be shown on display 120, in such case, the contextual object representing this list may still contain six entries. According to some embodiments of the invention, a contextual object may be associated with one or more logical operations. For example a list may be associated with a "scroll" operation, a button may be associated with a "click" operation. Processor 150 may use logical operations associated with contextual objects. For example, processor 150 may scroll a list in order to reach and select an item in the list. Reference is now made to FIG. 5 showing exemplary contextual objects that were possibly composed by grouping structured objects shown in image 410. List 520 may list some of the attributes of title 440, title 440 may have been identified by processor 150 as a contextual object. List 530 may list some of the attributes of title 450 that may have been identified by processor 150 as a contextual object.

Figure 6:
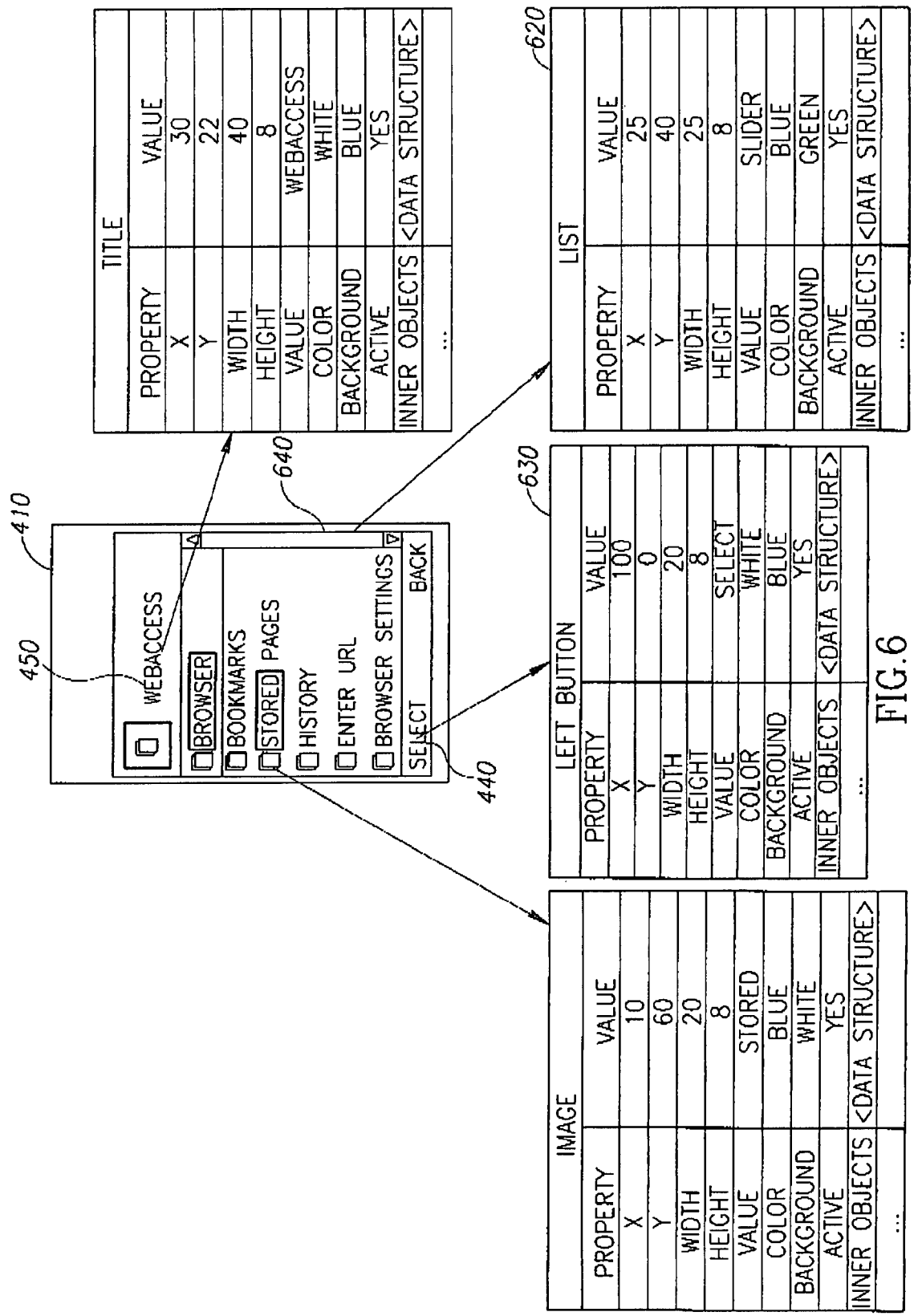
FIG. 6 shows exemplary screen objects according to some embodiments of the invention.

A third pass may further locate and identify contextual objects. Possibly using a template document, processor 150 may assign attributes to contextual objects, for example, a title found in the left, bottom corner of display 120 may be identified by processor 150 as a special item such as a handset leftbutton, where leftbutton may describe the function to be executed when a special key, typically the upper most left key, on a handset's keypad is pressed. Possibly using a template document, processor 150 may identify other contextual items such as but not limited to, titles, lists, a battery indicator, a clock, or a wireless link strength indicator. Reference is now made to FIG. 6 showing exemplary contextual objects which may be located and identified by processor 150 in image 410. List 630 may list some of the attributes of contextual object 440. As shown, list 630 may further note that this contextual object is a leftbutton object. List 620 may list some of the attributes of list 640. As shown, list 620 may note that item 640 is a list. Processor 150 may use contextual objects and information in a template document to determine the functional context and state of device 110. The ability of processor 150 to determine the functional context and state of device 110, combined with information in the template document, may enable complex test procedures. Following the issuance of commands to device 110, processor 150 may validate that these commands were executed correctly by device 110. This validation may be made possible by the ability of processor 150 to parse and analyze the display of device 110 as described above. Processor 150 may select commands based on the result of previous commands. For example, while testing a cellular phone, processor 150 may determine that device 110 failed to execute a command to add a contact to the contact list because the contact list capacity is exhausted, instead of determining that device 110 has failed the test, processor 150 may issue a command to device 110 to delete an entry from its contact list and may further instruct device 110 to repeat the attempt to add a contact to the contact list. Another example may be an incoming call. An incoming call may occur unexpectedly, possibly during some procedure, for example, an incoming call may occur during a call in progress. Based on an image of display 120, possibly combined with information in a template document, processor 150 may be aware of such unexpected events and may further instruct device 110 how to handle such events.

According to embodiments of the invention, processor 150 may be provided with a script or procedure. For example, a test procedure or test script may be provided. A test procedure may comprise a series of contextual commands as well as procedures for validating successful execution of commands. Transforming of contextual commands to specific instructions by a template document may enable reuse of the same script or procedure for testing a verity of devices. For example, commands such as "Send SMS", "Add Contact", or "Place Call" may be performed by a verity of cellular phones. Combined with a template document appropriate to the device under test, the same test procedure may be executed in order to test a verity of cellular phones.

According to some embodiments of the invention, a script may comprise object commands. Object commands may be associated with structured objects or contextual objects. Object commands may refer to objects on display 120. For example, a "Select" command for selecting an object in a list of objects, or a "Click" command for clicking an object. Another example of an object command may be a delete command for deleting an object, for example, deleting a contact in a contact list. In some embodiments of the invention, a script may further comprise utility functions. Utility functions may perform tasks such as comparing objects. Utility functions may typically perform operations pertaining to data available to processor 150. Utility functions may be used by processor 150 when validating results of the execution of a command by device 110, for example, comparing objects' values to expected values. Utility functions may perform complex tasks, for example a compare utility function may compare two contacts from a contact list by comparing each field associated with each of the two contacts. Another example of a complex compare operation which may be performed by such utility functions may be the comparison of test strings. Comparing text strings may involve determining attributes such as casing (uppercase or lowercase), line breaks, spaces and the like. Manipulation of images may be another task which may be performed by a utility function, for example, comparing images, changing the resolution of an image, or saving image. In some embodiments of the invention, a script may further comprise primitive commands Primitive commands may be commands such as, for example, "Press Key" which may instruct a key in device 110 keypad to be pressed.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A system for interacting with a device having a display comprising:
   an image acquisition device to acquire an image of the display of said device; and
   a processor including:
      a parser module to identify objects contained in said image,
      an analyzer module to derive functional information pertaining to said device based on said displayed objects,
      a selector module to select a command to be executed by said device based on said functional information and according to a test procedure, and
      an instructor module to instruct said device to execute said selected command.

2. The system of claim 1, wherein said command is to cause said device to perform a functionality selected from the group consisting of short message service, multimedia message service, electronic mail, instant messaging, mobile advertising, multimedia related applications, downloadable applications, network related applications.

3. The system of claim 1, wherein said command is to cause said device to download a downloadable application and execute said downloadable application.

4. The system of claim 1, wherein said command is to cause said device to execute a multimedia application.

5. The system of claim 1, wherein said command is to cause said device to execute a network related application.

6. The system of claim 1 wherein said command is selected according to a test procedure, and according to a functional state of said device, and according to a functional context of said device.

7. The system of claim 1, wherein said parser module is to identify at least some of said objects by grouping a plurality of structured objects into a contextual object.

8. The system of claim 1, wherein said parser module is to identify at least some of said objects by transforming said objects into predefined objects based on a template.

9. The system of claim 1, wherein said processor further includes a translator module to translate said selected command into a sequence of instructions according to a template, wherein said template is associated with said device.

10. The system of claim 9, further comprising a memory to store a plurality of templates, each said template being associated with at least one respective device, and wherein said processor is to select said template based on a type of said device.

11. The system of claim 9, further comprising a device communication means to communicate said sequence of instructions to the device for execution.

12. A method for interacting with a digital device comprising:
- acquiring an image of a display of said device;
- identifying objects displayed on said display of said device;
- deriving functional information pertaining to said device based on said displayed objects;
- selecting a command to be executed by said device based on said functional information and a test procedure; and
- instructing said device to execute said command.

13. The method of claim 12, wherein said command is to cause said device to perform an application selected from the group consisting of short message service, multimedia message service, electronic mail, instant messaging, and mobile advertising.

14. The method of claim 12, wherein said command is to cause said device to download a downloadable application and execute said downloadable application.

15. The method of claim 12, wherein said command is to cause said device to execute a multimedia application.

16. The method of claim 12, wherein said command is to cause said device to execute a network related application.

17. The method of claim 12 wherein said command is selected according to a test procedure, and according to a functional state of said device and according to a functional context of said device.

18. The method of claim 12, further comprising translating said selected command into a sequence of instructions according to a template, wherein said template is associated with said digital device.

19. The method of claim 18, further comprising choosing said template from a plurality of templates corresponding to a respective plurality of digital devices.

20. The method of claim 18, wherein identifying said objects further comprises transforming said objects to predefined objects according to information in said template.

21. The method of claim 12, wherein identifying at least some of said objects comprises grouping a plurality of structured objects into a contextual object.

* * * * *